Jan. 5, 1954     C. T. O'HARROW     2,664,804
TRACTOR DRAWBAR SUPPORT
Filed March 10, 1950
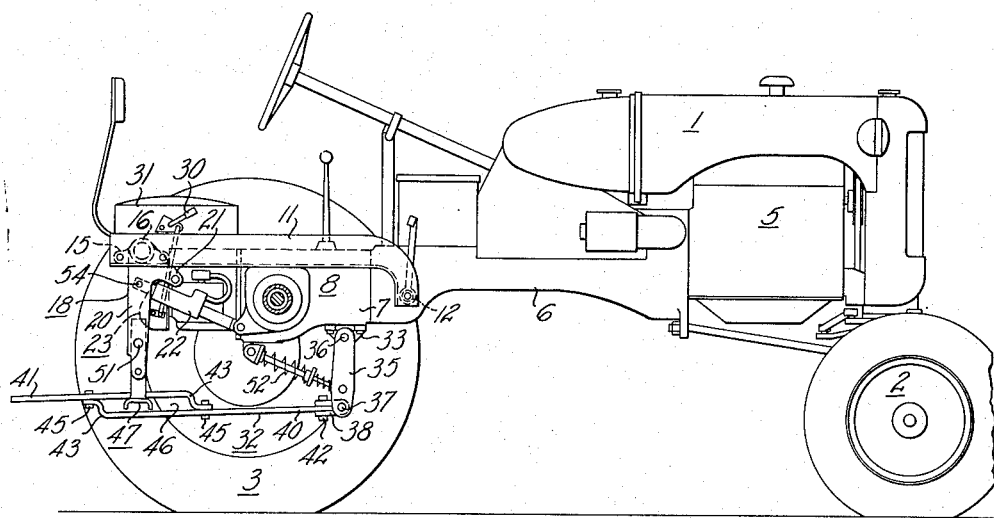
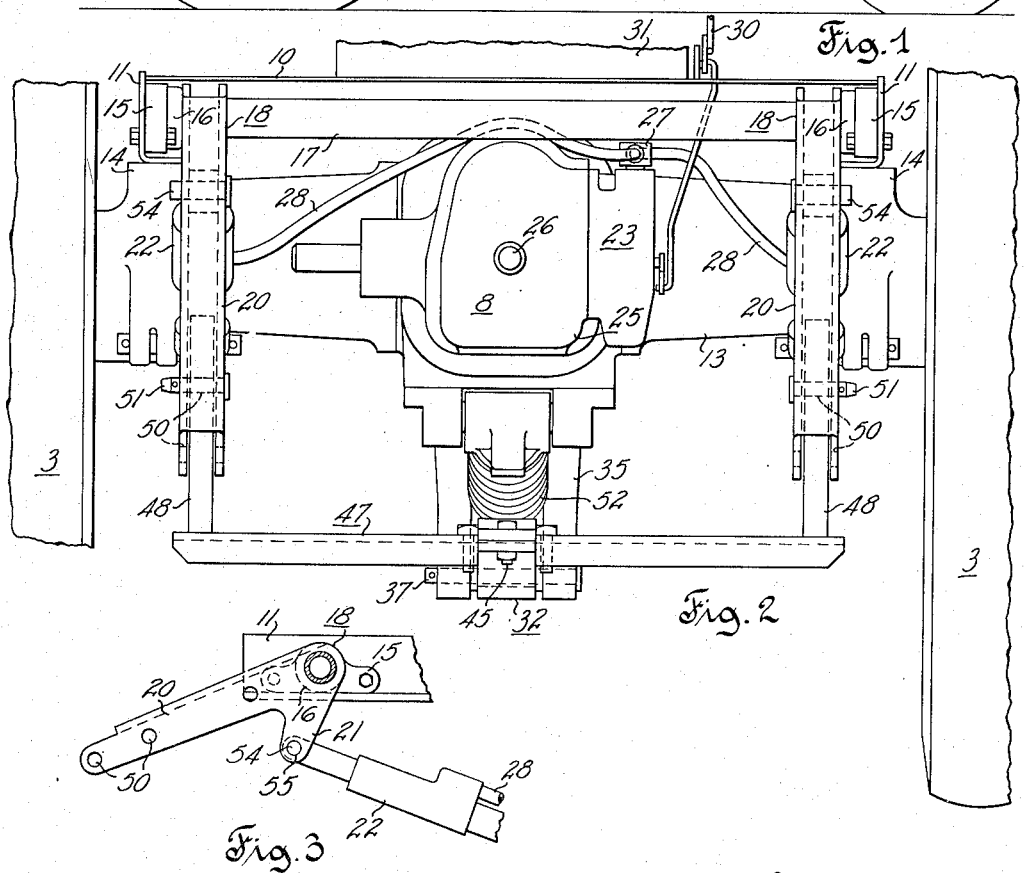
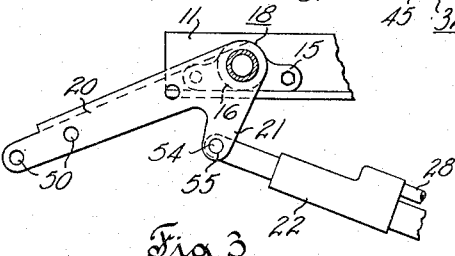
Inventor
Charles T. O'Harrow
by James D. Coffee
Attorneys Patented Jan. 5, 1954

2,664,804

UNITED STATES PATENT OFFICE 2,664,804

TRACTOR DRAWBAR SUPPORT

Charles T. O'Harrow, Wauwatosa, Wis., assignor to Allis-Chalmers Manufacturing Company, Milwaukee, Wis.

Application March 10, 1950, Serial No. 148,843

7 Claims. (Cl. 97—46.35)

1

This invention relates generally to self-propelled vehicles of the type customarily used in agricultural work and hereafter referred to as tractor, and is more particularly directed to apparatus mounted at the rear of such vehicles to facilitate the pulling of self-supported implements by the vehicle and, also, to serve as a means for lifting implements supported directly on the vehicle.

In utilizing tractors as a mobile source of power on the farm it has been found desirable to attach the drawbar to the tractor at a point in advance of the rear wheels in order to more efficiently use the tractive effort of the rear driving wheels and, also, to minimize the danger of tipping the tractor upwardly about the axis of the rear wheels. Such method of drawbar attachment necessarily involves the use of a relatively long drawbar which requires some support from the tractor adjacent its free end, generally in the form of a bail depending from the overlying rear end portion of the tractor.

Furthermore, it is generally known that pull type implements, that is, those drawn behind the tractor, may be either self-supporting or mounted directly on the tractor for support. In most instances a farmer will have both types of implements and, of course, his tractor must accommodate either type in order to be satisfactory. Moreover, in the case of many tractor supported implements, such as plows, it is necessary that some means be afforded for lifting and lowering the implement relative to the ground. Consequently, in the interest of utility it is important that a tractor be provided with means for attaching either a self-supported trailing implement or a mounted implement thereto, and, also, that the tractor be provided with means for raising and lowering the latter.

It is a principal object of this invention to provide a unitary structure for use with a tractor which affords a support for the free end of the drawbar when a self-supported implement is drawn behind the tractor and, also, affords a lift means for tractor mounted implements.

Another object of this invention is to provide structure for use with a tractor which serves as a drawbar support or as an implement lift means and which is a unitary structure, compact in arrangement, convenient to convert from one use to the other, durable, and relatively inexpensive to manufacture.

And accordingly the present invention may be considered as comprising the various constructions and combinations hereinafter more particularly pointed out in the detailed description and appended claims, reference being had to the accompanying drawings illustrating one embodiment of the invention and in which:

Fig. 1 is a side view of a tractor embodying the invention, with the near driving wheel removed to better show the arrangement of parts;

Fig. 2 is an enlarged rear view of the tractor shown in Fig. 1; and

Fig. 3 is an enlarged side elevation of a portion of the structure shown in Fig. 1 wherein the drawbar supporting bail has been removed and the hydraulic motors positioned for lifting implements.

Referring to Fig. 1 it is seen that apparatus embodying the present invention comprises generally a tractor 1 having a pair of dirigible front wheels 2 and a pair of rear traction wheels 3, and an engine 5 supported in part by the front wheels and attached to a generally tubular frame structure 6 which is supported at the rear of the tractor by a forwardly extending housing portion 7 of the rear axle structure 8. A conventional type of drive transmitting means (not shown) conveys power from the engine, through change speed gearing (also not shown) enclosed in housing portion 7, to the driving wheels 3. Since this portion of the tractor is not directly involved in the present invention, a more detailed explanation thereof is believed unnecessary.

The rear portion of the tractor includes a platform 10 (Fig. 2) supported on opposite sides of the tractor by a pair of elongated angle members 11 fixed, as by welding, to the top of end portions 14 of a transverse rear axle housing 13. The rear portion of tubular frame 6 has a transverse member 12 fixed thereto affording means for securing the forward end portions of members 11 in fixed relation to the tractor, and an intermediate portion of these members is fixedly supported on top of portions 14 of axle housing 13. Platform 10 and angle members 11 extend rearwardly of axle housing 13 and the rear end portions of members 11 mount a pair of transversely aligned brackets 15 disposed in inwardly facing relation with respect to the longitudinal axis of the tractor. Each of these brackets has a circular bearing portion 16 providing means for rotatably supporting a rockshaft 17 at opposite end portions thereof. And in Fig. 2 it will be seen that rockshaft 17 includes a pair of bell cranks or levers 18 non-rotatably secured to opposite end portions of the shaft adjacent bearings 16 so as to extend radially of the rockshaft 17 in side opposed relation to each other. Each of these levers includes a relatively long lift arm 20 functioning as a lift or support arm and a shorter actuating arm 21 providing means for attaching a lift operating means, such as a hydraulic ram, thereto.

In the illustrated embodiment the power lift means employed comprises a pair of single acting hydraulic motors or rams 22 pivotally mounted at one end thereof in laterally spaced relation on the tractor with the free end positionable for detachable connection with levers 18 in a selected one of several positions thereon. For supplying fluid to rams 22 there is provided a conventional type hydraulic pump 23 which is attached to a side of a rearwardly extending central portion 25 of axle housing 13 and is drivenly connected (by means not shown) to a power take-off shaft 26 extending through said housing. The upper portion of pump 23 includes an outlet 27 affording a connection with flexible conduits 28 extending to each of the hydraulic motors. Suitable operating means, including a hand lever 30 positioned within easy reach of an operator seated at station or seat 31 on the tractor, are provided for controlling the operation of pump 23. A more detailed description of this structure is believed unnecessary for a complete understanding of the present invention.

It will be noted (Fig. 1) that tractor 1 also includes an elongated drawbar structure 32 adaptable for use with either tractor mounted implements or self-supported implements drawn behind the tractor. More particularlyy, a support member or bracket 33 is fixedly secured to the underside of transmission housing 7 and a bifurcated lever 35 is pivotally suspended from this bracket by means of a pin 36 or the like. The free end of lever 35 includes another transverse pin 37 to which is attached a yoke 38 for vertical swinging movement relative thereto. The elongated drawbar comprising a forward section 40 and a rear section 41 is connected by a bolt 42 or the like to yoke 38 for lateral swinging movement relative thereto. The two sections 40 and 41 of the drawbar have oppositely offset end portions 43 providing means for attaching one section to the other, as by bolts 45, to thereby form a closure 46 intermediate the ends of the drawbar structure. This closure serves as a guide means for the bight portion of a drawbar supporting bail structure 47 in that it prevents relative displacement of these parts.

Bail structure 47 comprises, in addition to the aforesaid bight portion, a pair of laterally spaced leg portions 48 which are joined together by the bight portion at the lower end of the bail. As shown in Figs. 1 and 2, the leg portions 48 of the bail structure are connected in extension forming relation to lift arms 20 of levers 18. And in this respect, it has been found desirable to use channel members for arms 20 in order to provide for coaxial, telescopic engagement thereof with portions 48 of the bail. A series of transversely alignable openings 50 in the bail portions and lift arms 20 and a pin 51 provide means for a vertically adjustable connection between the two parts. And, as noted in Figs. 1 and 2, when the bail is in a drawbar supporting position the free ends of rams 22 are connected to an intermediate portion of lift arms 20 as by pins 54 or the like removably inserted through transversely aligned openings in the ram and arm. In this position the rams serve primarily as brace means for the drawbar supporting structure (Figs. 1 and 2). It will be noted, however, that drawbar 32 is designed to move fore and aft with respect to bail 47. A compression spring 52, which is pivotally mounted between axle housing 13 and pivot lever 35, opposes rearward movement of the drawbar but yields in response to a selected minimum draft force imposed on the drawbar.

Having seen the manner in which the described bail structure functions as a support for the drawbar it should be apparent that the conversion to a conventional lift means for an implement attached to the drawbar for vertical swinging movement therewith is relatively simple. The removal of bolt 42 at the front end of drawbar 32 and pins 51 in the openings 50 of lift arms 20 frees bail structure 47 and drawbar 32 from the tractor. And by changing the position of the free ends of rams 22 to the attaching position afforded by opening 55 (Fig. 3) on actuating arm 21 the levers 18 are positioned to operate through a wide arc in lifting underlying implements attached to the tractor. Such implements may either be attached directly to yoke 38, if they have a tongue structure of sufficient length, or drawbar 32 may be attached to yoke 38, after bail 47 has been removed therefrom by separating the sections 40 and 41 of the drawbar, to afford means for rigidly fixing an implement in vertically swingable relation to the tractor.

Thus, it is seen that the present invention provides a unitary structure which affords a vertically adjustable support for the free end of a tractor drawbar and which is readily convertible for use an an implement lift.

It is claimed and desired to secure by Letters Patent:

1. In a tractor having a longitudinally extending drawbar pivotally mounted thereon for swinging movement, and having a power lift means comprising a source of fluid pressure, and a fluid actuated motor pivotally mounted on the tractor for swinging movement relative thereto, an improved implement lift and drawbar supporting structure comprising, a rockshaft rotatably mounted on the tractor in transverse relation to said drawbar, a pair of laterally spaced lift arms nonrotatably fixed to said rockshaft, one of said lift arms being connected to the free end of the fluid actuated motor in a selected one of a plurality of positions on the lift arm, a bail structure having a bight portion connected in supporting relation to said drawbar and presenting a pair of relatively spaced leg portions joined together by said bight portion, and means detachably securing said leg portions, respectively, in adjustable extension forming coaxial relation to outer end portions of said lift arms.

2. In a tractor having a longitudinally extending drawbar pivotally mounted thereon for swinging movement vertically and transversely with respect to the longitudinal center line of the tractor, and having power lift means comprising a source of fluid pressure, and a fluid actuated motor pivotally mounted on the tractor for vertical swinging movement relative thereto, an improved implement lift and drawbar supporting structure comprising, a rockshaft rotatably mounted on said tractor in overlying transverse relation to the free end of said drawbar, a pair of laterally spaced lift arms nonrotatably fixed to said rockshaft so as to extend radially therefrom in side opposed relation to each other, one of said lift arms being connected with the free end of said fluid actuated motor in a selected one of a plurality of positions on the lift arm, a bail structure having a bight portion connected in supporting relation to the rear end portion of said drawbar and presenting a pair of relatively spaced leg portions joined together by said bight portion and telescopically engaged, respectively, with said lift arms in detachable extension forming and coaxial relation to the latter, and releasable fastening means operative to secure said leg portions in telescopically adjusted positions, respectively, to said lift arms.

3. In a tractor having a longitudinally extending drawbar pivotally mounted thereon for swinging movement vertically and transversely with respect to the longitudinal center line of the tractor, and having a power lift means comprising a source of fluid pressure, and a pair of laterally spaced fluid actuated motors pivotally mounted on the tractor for vertical swinging movement relative thereto, an improved implement lift and drawbar supporting structure comprising, a rock shaft rotatably mounted on said tractor in transverse relation to said drawbar, a pair of laterally spaced lift arms nonrotatably fixed to said rockshaft, said lift arms being connected with the free ends of the fluid actuated motors in a selected one of a plurality of positions on said lift arms, a bail structure having a bight portion connected in supporting relation to said drawbar and presenting a pair of relatively spaced leg portions joined together by said bight portion, and means detachably securing said leg portions, respectively, in adjustable extension forming coaxial relation to outer end portions of said lift arms.

4. In a tractor having a longitudinally extending drawbar pivotally mounted thereon for swinging movement, and having a power lift means comprising a source of power, and a pair of laterally spaced power transmitting means mounted on the tractor, an improved implement lift and drawbar supporting structure comprising, a pair of laterally spaced lift arms pivotally mounted on the tractor for swinging movement, said lift arms being connected with said power transmitting means in a selected one of a plurality of positions on said lift arms, a bail structure having a bight portion connected in supporting relation to said drawbar and presenting a pair of relatively spaced leg portions joined together by said bight portion, and means detachably securing said leg portions, respectively, in adjustable extension forming coaxial relation to the outer end portions of said lift arms.

5. In a tractor having a longitudinally extending drawbar pivotally mounted thereon for swinging movement, and having a power lift means comprising a source of power and power transmitting means mounted at the rear of the tractor, an improved implement lift and drawbar supporting structure comprising, a pair of laterally spaced lift levers pivotally mounted on the tractor above the drawbar structure, one of said lift levers being connected with said power transmitting means, a bail structure having a bight portion connected in supporting relation to said drawbar and presenting a pair of relatively spaced leg portions joined together by said bight portion, and means detachably securing said leg portions, respectively, in extension forming, coaxial relation to outer end portions of said lift levers.

6. In a tractor having a drawbar mounted thereon for swinging movement, and having a power lift comprising a source of power and means for translating the power into reciprocating motion at the rear of said tractor, an improved implement lift and drawbar supporting structure comprising, a rockshaft rotatably mounted on said tractor in transverse relation to said drawbar, a pair of laterally spaced levers nonrotatably fixed to said rockshaft in side opposed relation to each other, each of said levers presenting a lift arm in radially extending relation to said rock shaft, and at least one of said levers presenting an actuating arm angularly disposed with respect to its associated lift arm and operably connected with said power translating means, a bail structure having a bight portion connected in supporting relation to said drawbar and presenting a pair of relatively spaced leg portions joined together by said bight portion, and means connecting said leg portions, respectively, in coaxial relation to said lift arms of said levers.

7. In a tractor having a longitudinally extending drawbar mounted thereon for vertical swinging movement, and having a power lift means comprising a source of fluid pressure, and a fluid actuated motor pivotally mounted on the tractor for swinging movement relative thereto, an improved implement lift and drawbar supporting structure comprising, a pair of laterally spaced levers each presenting a lift arm and at least one presenting an actuating arm angularly disposed with respect to its associated lift arm, said levers being pivotally mounted at the rear of said tractor with said actuating arm operably connected with said fluid actuated motor, a bail structure having a bight portion connected in supporting relation to said drawbar and presenting a pair of relatively spaced leg portions joined together by said bight portion, and means detachably securing said leg portions, respectively, in adjustable extension forming coaxial relation to said lift arms.

CHARLES T. O'HARROW.

References Cited in the file of this patent

UNITED STATES PATENTS

| Number | Name | Date |
|---|---|---|
| 1,846,489 | Johnson | Feb. 23, 1932 |
| 2,109,677 | Morkoski | Mar. 1, 1938 |
| 2,342,306 | Silver | Feb. 22, 1944 |
| 2,395,322 | Evans | Feb. 19, 1946 |
| 2,414,114 | Martin | Jan. 14, 1947 |
| 2,497,319 | Mott | Feb. 14, 1950 |